(12) United States Patent
Singamshetty (10) Patent No.: US 9,152,669 B2
(45) Date of Patent: Oct. 6, 2015

(54) SYSTEM AND METHOD FOR DISTRIBUTED SQL JOIN PROCESSING IN SHARED-NOTHING RELATIONAL DATABASE CLUSTERS USING STATIONARY TABLES

(71) Applicant: FutureWei Technologies, Inc., Plano, TX (US)

(72) Inventor: Mohan Singamshetty, Sunnyvale, CA (US)

(73) Assignee: Futurewei Technologies, Inc., Plano, TX (US)

( * ) Notice: Subject to any disclaimer, the term of this patent is extended or adjusted under 35 U.S.C. 154(b) by 232 days.

(21) Appl. No.: 13/802,084

(22) Filed: Mar. 13, 2013

(65) Prior Publication Data
US 2014/0280021 A1    Sep. 18, 2014

(51) Int. Cl.
*G06F 17/00* (2006.01)
*G06F 17/30* (2006.01)
*G06F 1/035* (2006.01)

(52) U.S. Cl.
CPC .......... *G06F 17/30442* (2013.01); *G06F 1/035* (2013.01)

(58) Field of Classification Search
CPC .................. G06F 17/30598; G06F 17/30705; G06F 17/30241; G06F 17/30091; G06F 17/30312
USPC ......................................................... 707/737
See application file for complete search history.

(56) References Cited

U.S. PATENT DOCUMENTS

| 2009/0198703 A1* | 8/2009 | Ezzat et al. ..................... 707/10 |
| 2011/0246481 A1 | 10/2011 | Narayanan et al. |
| 2012/0036146 A1 | 2/2012 | Annapragada |

FOREIGN PATENT DOCUMENTS

| CN | 101714152 A | 5/2010 |
| CN | 102201010 A | 9/2011 |
| CN | 102521307 A | 6/2012 |

OTHER PUBLICATIONS

International Search Report received in PCT/CN2014/073390, mailed Jun. 11, 2014, 11 pages.

* cited by examiner

*Primary Examiner* — Truong Vo
(74) *Attorney, Agent, or Firm* — Slater & Matsil, L.L.P.

(57) ABSTRACT

System and method embodiments are provided for improving the performance of query processing in a massively parallel processing (MPP) database system by selecting one or more stationary tables for processing the query plan. In an embodiment method, a join query associated with a plurality of tables of the MPP database system is received at a coordinator process. Stationary tables are then selected from the tables according to table partition keys in the join query. The stationary tables are indicated and the join query is sent to a plurality of data nodes communicating with the coordinator process. At each of the data nodes, an execution plan for the join query is generated. Each of the data nodes then executes the execution plan to obtain query results without sharing information of the stationary tables between the data nodes.

21 Claims, 6 Drawing Sheets

SYSTEM AND METHOD FOR DISTRIBUTED SQL JOIN PROCESSING IN SHARED-NOTHING RELATIONAL DATABASE CLUSTERS USING STATIONARY TABLES

TECHNICAL FIELD

The present invention relates to database processing and computing, and, in particular embodiments, to a system and method for distributed SQL join processing in shared-nothing relational database clusters using stationary tables.

BACKGROUND

A massively parallel processing (MPP) database system allows a database administrator to create a database and distribute its data to a number of processors, called partitions or data nodes. The concept of MPP is the coordinated processing of a program by multiple processors, with each processor working on different parts of the program. The processors communicate with one another to complete a task, with each of them using its own operating system and memory resources. There is usually at least one process that serves clients of the MPP database system, called coordinator. A Structured Query Language (SQL) join query issued against such a database is handled by the coordinator that selects data tables to fulfill the join query and sends this information to each data node for execution.

SUMMARY OF THE INVENTION

In accordance with an embodiment, a method for query processing in a massively parallel processing (MPP) database system includes receiving, at a coordinator process, a join query associated with a plurality of tables of the MPP database system, selecting stationary tables form the tables, and executing, at each of a plurality of data nodes communicating with the coordinator process, an execution plan to obtain query results without passing information of the stationary tables between the data nodes.

In accordance with another embodiment, a method for query processing in a MPP database system includes receiving, at a coordinator process, a join query associated with a plurality of tables of the MPP database system, selecting stationary tables from the tables according to table partition keys in the join query, and indicating the stationary tables and sending the join query to a plurality of data nodes communicating with the coordinator process. The method further includes generating, at each of the data nodes, an execution plan for the join query, and executing, at each of the data nodes, the execution plan to obtain query results without sharing information of the stationary tables between the data nodes.

In accordance with yet another embodiment, an apparatus for query processing in a MPP database system includes a plurality of data nodes configured to process a join query on partitions of data tables of the MPP database system, a processor, and a computer readable storage medium storing programming for execution by the processor. The programming includes instructions to receive, at a coordinator process communicating with the data nodes, a join query associated with the tables, select stationary tables from the tables, indicate the stationary tables send the join query to the data nodes, and combine, a plurality of query results from the data nodes.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

A MPP database system is based on shared-nothing architecture, with the tables divided into partitions and distributed to different processing nodes. Each partition is assigned to one processing node exclusively, where there is no data sharing among the partitions at the nodes. The processing nodes are also referred to herein as data nodes. The processing entities in each node manage and process their portion of the data. However, these processing entities may communicate with one another to exchange necessary information during execution. For each client connection, the system creates an agent process or thread responsible for user transaction management and query processing. This agent process or thread is called a coordinator, which may or may not reside on one of the data nodes. When queries arrive at a coordinator, the coordinator invokes a query compiler to generate a semantic tree. A query planner is then invoked to generate an optimized execution plan for the tree. The execution plan organizes the task for handling the query to the processing units (the data nodes). The results from the data nodes are returned and aggregated at the coordinator and then sent to the user.

Figure 1:
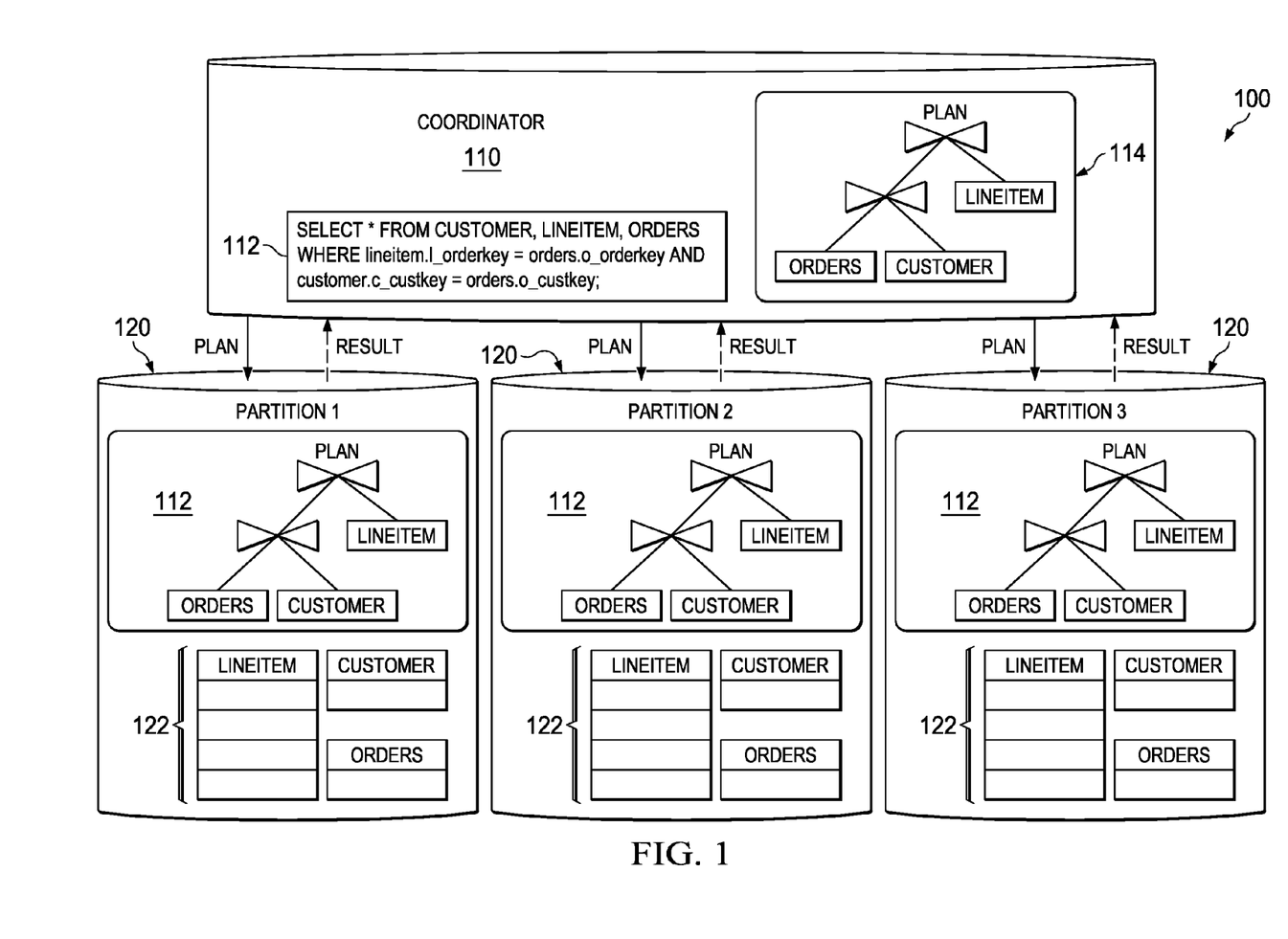
FIG. 1 illustrates a typical MPP database system.

FIG. 1 shows a typical MPP database system 100 for processing SQL join queries. In the MPP database system 100, a client application connects to the database through a coordinator 110, which is an agent process or application (e.g., a program). The coordinator 110 is connected to multiple data nodes 120 in the system. Each data node 120 can have an exclusive access to a partition of data tables 122 in the database. The coordinator 110 processes a SQL join query 112 for the client using parallel processing at the data nodes 120 and returns an aggregated result from the data nodes 120 to the client. Each data node 120 processes a plan 114 for the query 112, which is sent from the coordinator 110, on different exclusive partitions of the data tables 122 without common partition data. However, the data nodes 120 can still exchange table data (e.g., rows) between each other to complete their respective part of the join query processing.

Figure 2:
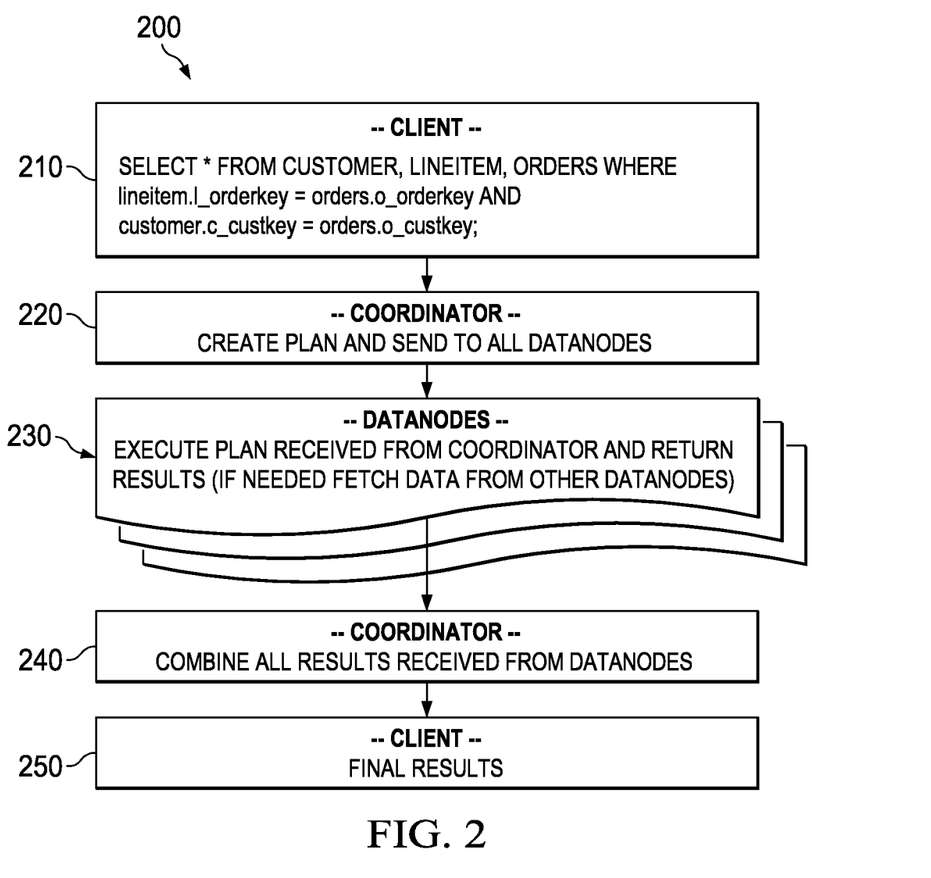
FIG. 2 is a query execution flow of a typical MPP database system.

FIG. 2 shows a query execution flow 200 of the MPP database system 100. At step 210, the coordinator 110 receives a query from a client. For example, the coordinator 110 receives the SQL query: "select * from customer, lineitem, orders where lineitem.l_orderkey=orders.o_orderkey AND customer.c_custkey=orders.o_custkey." At step 220, the coordinator 110 compiles the query to generate a query execution plan, and sends the query plan to the data nodes 120. At step 230, each data node 120 instantiates a query plan segment, exchanges data with other nodes when necessary, and computes a result for the query by operating on a plurality of data tables associated with the query (e.g., lineitem, orders, and customer). Each data node 120 then returns the result to the coordinator 110. At step 240, the coordinator 110 gathers results from the data nodes 120 and combines the results. At step 250, the coordinator 110 returns the query result to the client.

In the MPP database system 100 and the query execution flow 200, data (e.g., rows) from all tables needed for processing the join query (e.g., the tables lineitem, customer, and orders) are forwarded between the data nodes 120. The table partitions are distributed among the data nodes, but other data needed in other partitions is also accessible (e.g., via data transfer) by the different data nodes without restriction. This can cause substantial overload of resources for data transfer and processing, which may reduce performance (e.g., in processing speed).

System and method embodiments are provided for improving the performance of query processing in a MPP database system. The embodiments include selecting one or more stationary tables for processing the query plan. Unlike a typical MPP database system, the partitions of the stationary table(s) assigned to the corresponding data nodes are stationary and not shuffled between the different data nodes. The data nodes have exclusive access to the corresponding partitions of a stationary data table. This means that no forwarding of partitions of stationary tables (or rows in the stationary tables) is allowed between the different data nodes. The rest of the tables (non-stationary tables) can be shuffled (back and forth) between the data nodes when needed in a conventional manner. The set of one or more stationary tables is selected by the coordinator and indicated to the data nodes. The join query is also pushed from the coordinator to the data nodes, e.g., without an execution plan. Each data node then generates a query execution plan with the stationary table information and executes the query accordingly. This scheme allows each data node to execute the join query plan in parallel and complete the job faster with fewer data shuffled around. Thus, the overall performance of join query processing and hence system throughput can be improved.

The one or more stationary tables can be selected and indicated (by the coordinator) to the data nodes based on partitions keys in the query. In a multi-table join query, the groups of tables joining on respective partition keys are identified. The identification process can end up in groups with a single table. Next, the combined weight of each group is obtained and the group that has the highest weight is then designated as the group for stationary tables. In the remainder of the query processing process (at the data nodes), this group of stationary tables is not moved around (between the data nodes), which can result in improved performance with faster planning and processing. The stationary group selection based on highest weight can significantly reduce the data shuffling among data nodes. For example, typical join queries in data warehouse scenarios may have about 70 to 80 percent of data residing in the stationary group. Thus, this scheme can provide substantial performance gains in typical data warehouse scenarios.

Figure 3:
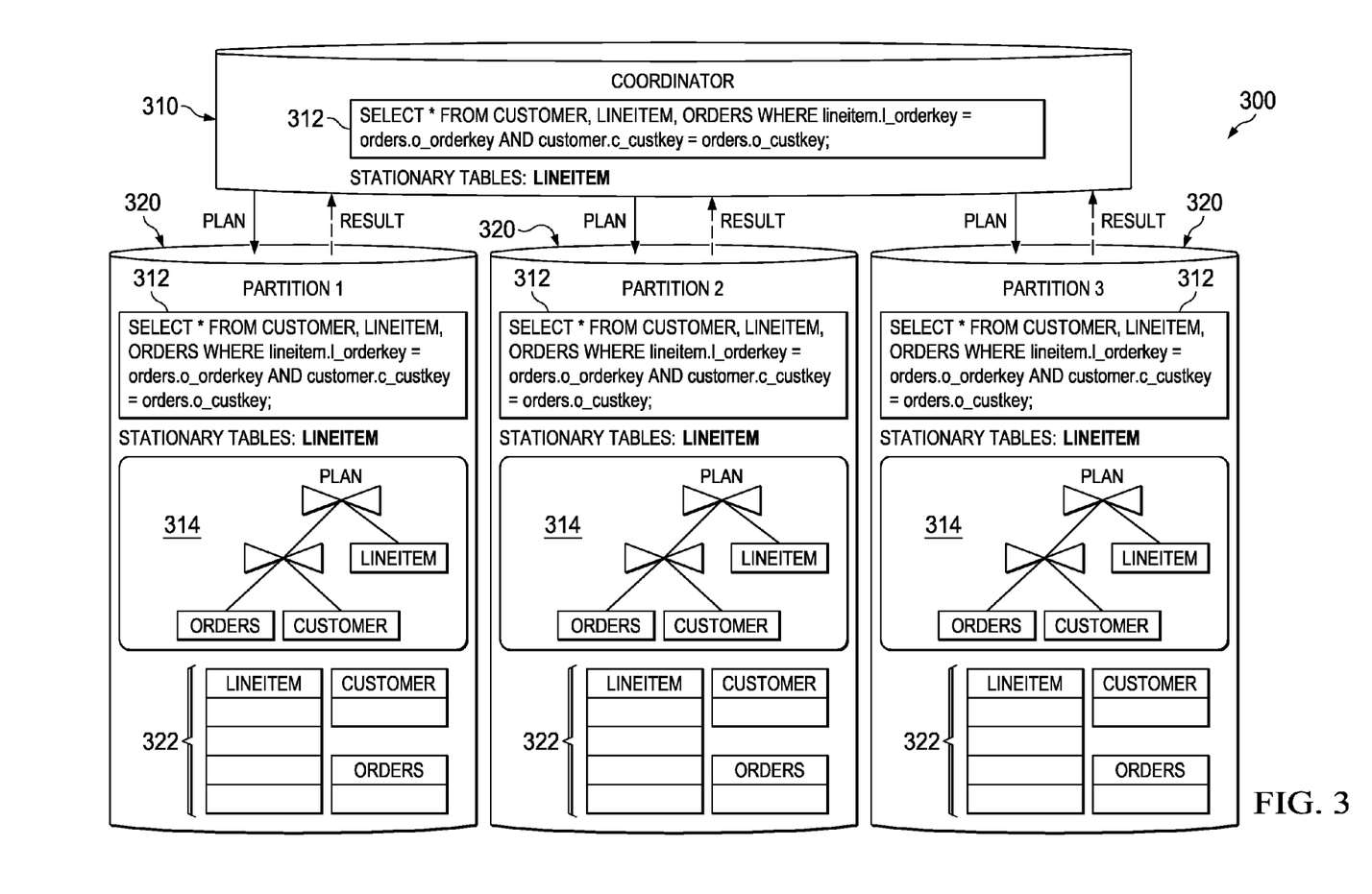
FIG. 3 illustrates an embodiment of a MPP database system with one stationary table.

FIG. 3 shows an embodiment of a MPP database system 300 with one stationary table selected for processing a SQL join query. In the MPP database system 300, a client application connects to the database through a coordinator 310. The coordinator 310 is connected to multiple data nodes 320 in the system. Each data node 320 can have an exclusive access to a partition of data tables 322 in the database. The coordinator 310 processes a SQL join query 312 for the client using parallel processing at the data nodes 320 and returns an aggregated result from the data nodes 320 to the client. The processing includes selecting a stationary table. For example, the table lineitem is the largest table and is selected as the stationary table based on the partitions keys l_orderkey and o_orderkey in the join query: lineitem.l_orderkey=orders.o_orderkey. Each data node 320 generates and processes a plan 314 for the query 312, which is pushed down from the coordinator 310, on different exclusive partitions of the data tables 322 without common partition data. When executing the plan 314 instantiated on each of the data nodes 320, no data or rows in the stationary table lineitem are moved around (between the data nodes 320). However, the data or rows from other tables can be moved back and forth between any two data nodes 320 to complete their join query processing on their respective partitions.

Figure 4:
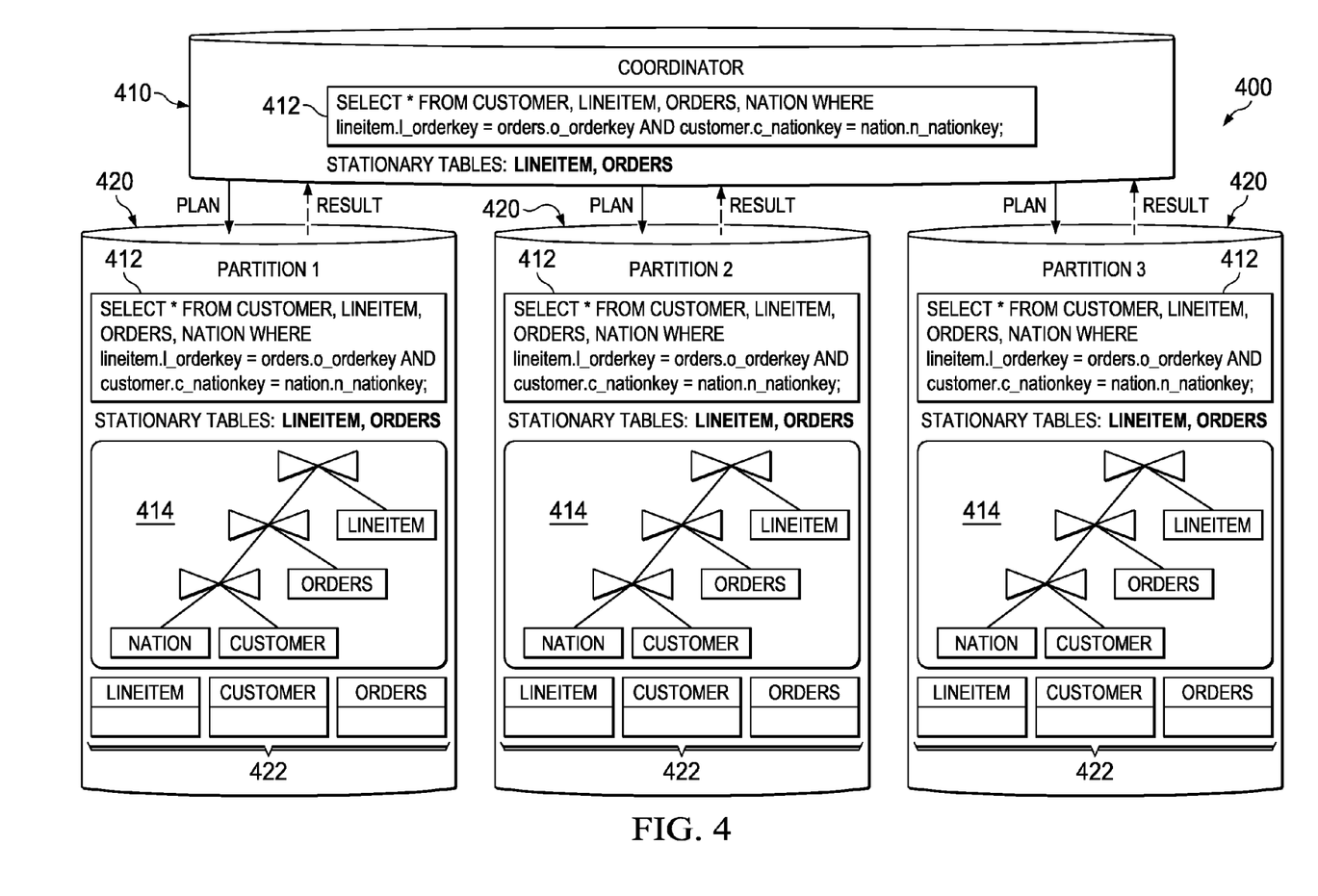
FIG. 4 illustrates an embodiment of a MPP database system with multiple stationary tables.

FIG. 4 shows another embodiment of a MPP database system 400 with multiple stationary tables selected for processing a SQL join query. In the MPP database system 400, a client application connects to the database through a coordinator 410. The coordinator 410 is connected to multiple data nodes 420 in the system. Each data node 420 can have an exclusive access to a partition of data tables 422 in the database. The coordinator 410 processes a SQL join query 412 for the client using parallel processing at the data nodes 420 and returns an aggregated result from the data nodes 420 to the client. The processing includes selecting one or more stationary tables based on partition keys in the join query 412. For example, the tables lineitem and orders are selected as the stationary tables based on the partitions keys l_orderkey and o_orderkey in the join query: lineitem.l_orderkey=orders.o_orderkey. Each data node 420 generates and processes a plan 414 for the query 412, which is pushed down form the coordinator 410, on different exclusive partitions of the data tables 422 without common partition data. When executing the plan 414 on the data nodes 420, no data or rows in the stationary tables lineitem and order are not moved around (between the data nodes 420) but the data or rows from other tables can be moved back and forth between any two data nodes 420 to complete their join query processing on their respective partitions.

Figure 5:
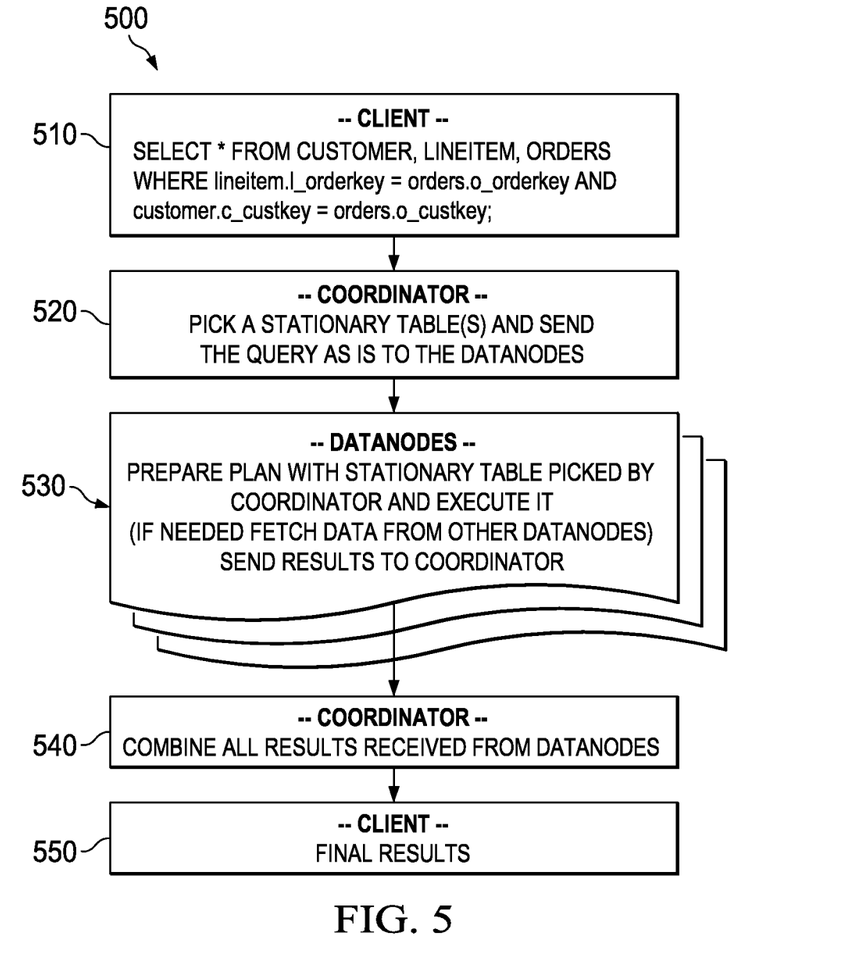
FIG. 5 is an embodiment of a query execution flow of the MPP database system with at least one stationary table.

FIG. 5 shows an embodiment of a query execution flow 500 of the MPP database system 300 or 400 with at least one stationary table. At step 510, the coordinator receives a query from a client. For example, the coordinator receives the SQL query: "select * from customer, lineitem, orders where lineitem.l_orderkey=orders.o_orderkey AND customer.c_custkey=orders.o_custkey." At step 520, the coordinator selects one or more stationary tables, e.g., based on partition keys in the query, as described above. The coordinator then sends the query and indicates the one or more stationary tables to the data nodes. At step 530, each data node compiles the query to generate a query execution plan taking into account the one or more stationary tables. Each data node then instantiates a query plan segment, exchanges data with other nodes when necessary excluding the stationary tables, computes a result for the query, and returns the result to the coordinator. The same execution plan is executed at each of the data nodes on the different exclusive partitions of the tables. At step 540, the coordinator gathers and combines the results from the data nodes. At step 550, the coordinator returns the query result to the client.

Figure 6:
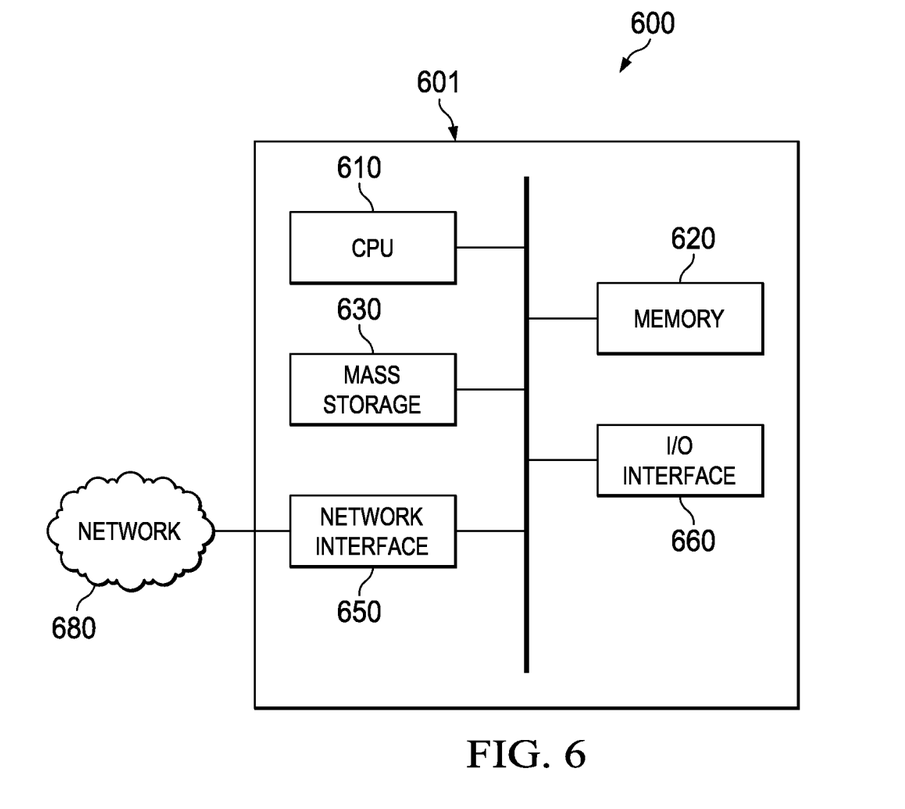
FIG. 6 is a processing system that can be used to implement various embodiments.

FIG. 6 is a block diagram of a processing system 600 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 600 may comprise a processing unit 601 equipped with one or more input/output devices, such as a network interfaces, storage interfaces, and the like. The processing unit 601 may include a central processing unit (CPU) 610, a memory 620, a mass storage device 630, and an I/O interface 660 connected to a bus. The bus may be one or more of any type of several bus architectures including a memory bus or memory controller, a peripheral bus or the like.

The CPU 610 may comprise any type of electronic data processor. The memory 620 may comprise any type of system memory such as static random access memory (SRAM), dynamic random access memory (DRAM), synchronous DRAM (SDRAM), read-only memory (ROM), a combination thereof, or the like. In an embodiment, the memory 620 may include ROM for use at boot-up, and DRAM for program and data storage for use while executing programs. In embodiments, the memory 620 is non-transitory. The mass storage device 630 may comprise any type of storage device configured to store data, programs, and other information and to make the data, programs, and other information accessible via the bus. The mass storage device 630 may comprise, for example, one or more of a solid state drive, hard disk drive, a magnetic disk drive, an optical disk drive, or the like.

The processing unit 601 also includes one or more network interfaces 650, which may comprise wired links, such as an Ethernet cable or the like, and/or wireless links to access nodes or one or more networks 680. The network interface 650 allows the processing unit 601 to communicate with remote units via the networks 680. For example, the network interface 650 may provide wireless communication via one or more transmitters/transmit antennas and one or more receivers/receive antennas. In an embodiment, the processing unit 601 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for query processing in a massively parallel processing (MPP) database system, the method comprising:
   receiving, at a coordinator process that runs on the MPP, a join query associated with a plurality of tables of the MPP database system;
   designating, from the tables to a plurality of processing nodes of the MPP, stationary tables and non-stationary tables, wherein the join query is processed by passing at least some information stored in the non-stationary tables between the processing nodes without passing any information stored in the stationary tables between the processing nodes; and
   executing, at each of the processing nodes, an execution plan to obtain query results, wherein executing the execution plan comprises passing at least some data stored in the non-stationary tables between the processing nodes without passing any information stored in the stationary tables between the processing nodes.

2. The method of claim 1 further comprising generating, at each of the processing nodes, the execution plan for the join query taking into consideration the stationary tables.

3. The method of claim 1 further comprising combining, at the coordinator process, the query results from the processing nodes to obtain a final result.

4. The method of claim 1, wherein the stationary tables are selected according to partition keys in the join query.

5. The method of claim 4 further comprising:
   identifying groups of tables in the join query that join on respective partition keys;
   calculating a combined weight of each group; and
   designate tables in a group with highest weight as stationary.

6. The method of claim 1 further comprising aggregating, at the coordinator process, the query results from each of the processing nodes.

7. The method of claim 1, wherein the execution plan comprises an organized task for handling the join query.

8. A method for query processing in a massively parallel processing (MPP) database system, the method comprising:
   receiving, at a first processing node of the MPP from a coordinator process that runs on the MPP, a join query associated with a plurality of tables of the MPP database system;
   receiving an indication specifying that at least a first stationary data partition from stationary tables has been assigned to the first processing node, wherein the stationary tables are selected from the plurality of tables by the coordinator process according to table partition keys in the join query, wherein plurality of tables further includes non-stationary tables, and wherein the join query is configured to be processed by passing at least some data stored in the non-stationary tables between processing nodes of the MPP without passing any information stored in the stationary tables between the processing nodes;
   generating an execution plan for the join query; and
   executing, at the first processing node, the execution plan to obtain query results, wherein the first processing node executes the execution plan by sharing at least some information in the non-stationary tables with other processing nodes without sharing information of the first stationary data partition with other processing nodes of the MPP that are processing the same join query.

9. The method of claim 8 further comprising:
   forwarding the query results from the first processing node to the coordinator process to combine, at the coordinator process, the query results.

10. The method of claim 9, wherein a plurality of exclusive partitions of the tables are allocated to the first processing node and the other processing nodes, wherein the exclusive partitions for different processing nodes do not comprise common data rows, and wherein the execution plan is executed to obtain query results on the exclusive partitions allocated for the first processing node.

11. The method of claim 10, wherein data at different exclusive partitions of the stationary tables at the different processing nodes are not moved between the different processing nodes.

12. The method of claim 10, wherein data at different exclusive partitions of the tables that are not stationary tables at the different processing nodes are moved between the different processing nodes to execute the execution plan at the processing node.

13. The method of claim 12, wherein the data is moved between the different processing nodes upon request from the first processing node when the data is needed to complete the execution plan for the join query and is not available locally.

14. The method of claim 10, wherein the same execution plan is executed at each of the processing nodes on the different exclusive partitions of the tables.

15. An apparatus for query processing in a massively parallel processing (MPP) database system, the apparatus comprising:
- a plurality of data nodes configured to process a join query on partitions of data tables of the MPP database system;
- a processor; and
- a computer readable storage medium storing programming for execution by the processor, the programming including instructions to:
  - receive, at a coordinator process communicating with the data nodes, a join query associated with the tables;
  - designate stationary tables and non-stationary tables from the tables, wherein the join query is processed by passing at least some information stored in the non-stationary tables between the data nodes without passing any information stored in the stationary tables between the data nodes;
  - indicate the stationary tables and send the join query to the data nodes, wherein the data nodes execute execution plans to generate query results by sharing at least some data stored in the non-stationary tables with other data nodes without sharing any information stored in the stationary tables with other data nodes; and
  - combine the query results generated by the data nodes.

16. The apparatus of claim 15, wherein the data nodes are further configured to forward the query results to the coordinator process.

17. The apparatus of claim 16, wherein the data nodes generate the execution plan for the join query taking into consideration the stationary tables.

18. The apparatus of claim 15, wherein the programming includes further instructions to allocate a plurality of exclusive partitions of the tables to the data nodes, wherein the exclusive partitions for different data nodes do not comprise common data rows.

19. The apparatus of claim 18, wherein the data nodes execute the same execution plan on the different exclusive partitions to obtain query results.

20. The apparatus of claim 19, wherein the data nodes do not share data in the different exclusive partitions of the stationary tables with other data nodes.

21. The apparatus of claim 19, wherein the data nodes share data in the non-stationary tables upon request from the data nodes.

* * * * *